(12) United States Patent
Suzuki et al.

(10) Patent No.: US 8,043,747 B2
(45) Date of Patent: Oct. 25, 2011

(54) BINDER RESIN COMPOSITION FOR NONAQUEOUS ELECTROLYTE ENERGY DEVICE ELECTRODE, NONAQUEOUS ELECTROLYTE ENERGY DEVICE ELECTRODE, AND NONAQUEOUS ELECTROLYTE ENERGY DEVICE

(75) Inventors: Kenji Suzuki, Hitachi (JP); Kiyotaka Mashita, Ichihara (JP); Iwao Fukuchi, Hitachi (JP); Satoshi Nakazawa, Hitachi (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 740 days.

(21) Appl. No.: 11/575,335

(22) PCT Filed: Feb. 28, 2005

(86) PCT No.: PCT/JP2005/003267
§ 371 (c)(1),
(2), (4) Date: Mar. 15, 2007

(87) PCT Pub. No.: WO2006/033173
PCT Pub. Date: Mar. 30, 2006

(65) Prior Publication Data
US 2008/0003506 A1    Jan. 3, 2008

(30) Foreign Application Priority Data
Sep. 22, 2004 (JP) .................. 2004-275738

(51) Int. Cl.
H01M 4/62  (2006.01)
(52) U.S. Cl. .................. 429/217; 252/182.1
(58) Field of Classification Search .......... 429/122–347; 29/623.1–623.5; 526/297, 318.5; 252/182.1
See application file for complete search history.

(56) References Cited

U.S. PATENT DOCUMENTS

| 2002/0034686 A1* | 3/2002 | Yamakawa et al. ........... 429/217 |
| 2002/0114142 A1 | 8/2002 | Go |
| 2005/0069769 A1* | 3/2005 | Nakayama et al. ........... 429/217 |

FOREIGN PATENT DOCUMENTS

| JP | 2001-256980 | 9/2001 |
| JP | 2002-110169 | 4/2002 |
| JP | 2002-231251 | 8/2002 |
| JP | 2003-132893 | 5/2003 |
| JP | 2003-317722 | 11/2003 |
| JP | 2004-185826 | 7/2004 |
| WO | WO 03/036744 | 5/2003 |

OTHER PUBLICATIONS

S.S. Zhang, et al.; Study of poly(acrylonitrile-methyl methacrylate) as binder for graphite anode and LiMn2O4 cathode of Li-ion batteries; Journal of Power Sources 109 (2002) p. 422-426.

* cited by examiner

*Primary Examiner* — Basia Ridley
*Assistant Examiner* — Jonathan G Leong
(74) *Attorney, Agent, or Firm* — Antonelli, Terry, Stout & Kraus, LLP.

(57) ABSTRACT

A binder resin composition, and an electrode for nonaqueous electrolyte energy devices and a nonaqueous electrolyte energy device including the binder resin composition. The binder resin composition includes a copolymer that contains a repeat unit derived from a nitrile group-containing monomer; a repeat unit derived from a monomer represented by Formula (I)

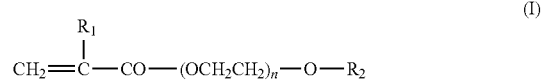

(wherein $R_1$ is H or $CH_3$; $R_2$ is H or monovalent hydrocarbonyl group; and n is an integer from 1 to 50) and/or a repeat unit derived from a monomer represented by Formula (II)

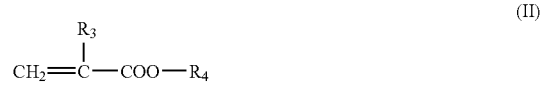

(wherein $R_3$ is H or $CH_3$ and $R_4$ is hydrogen or $C_{4-100}$ alkyl); and optionally a repeat unit derived from a carboxyl group-containing monomer.

5 Claims, No Drawings

BINDER RESIN COMPOSITION FOR NONAQUEOUS ELECTROLYTE ENERGY DEVICE ELECTRODE, NONAQUEOUS ELECTROLYTE ENERGY DEVICE ELECTRODE, AND NONAQUEOUS ELECTROLYTE ENERGY DEVICE

TECHNICAL FIELD

The present invention relates to a binder resin composition for nonaqueous electrolyte energy device electrodes, to an electrode for nonaqueous electrolyte energy devices, and to nonaqueous electrolyte energy devices.

BACKGROUND ART

Lithium ion secondary batteries, which are nonaqueous electrolyte-type energy devices that have high energy densities, are widely used as a power source for portable information terminals such as notebook personal computers, portable phones, and PDAs.

The negative electrode active material used in these lithium ion secondary batteries (referred to hereafter simply as lithium batteries) is a carbon material that has a multilayer structure that has the ability to intercalate the lithium ion between layers (formation of a lithium interlayer compound) and to discharge the lithium ion. A lithium-containing complex metal oxide is primarily used as the positive electrode active material. The electrodes of lithium batteries are fabricated by preparing a slurry by mixing and kneading these active materials with a binder resin composition and a solvent (for example, N-methyl-2-pyrrolidone or water); coating this slurry, using, for example, a transfer roll, on one or both surfaces of a metal foil that acts as a current collector; forming a composite layer by drying off the solvent; and thereafter compression molding with, for example, a roll press.

Polyvinylidene fluoride (PVDF) is frequently used for the aforementioned binder resin composition. However, PVDF exhibits a poor adhesiveness for the negative electrode current collector (copper foil), and, when a negative electrode is fabricated using PVDF, it therefore becomes necessary to blend large amounts of PVDF relative to the negative electrode active material in order to secure adhesion at the interface between the composite layer and current collector, which impedes the effort to raise the capacity of lithium batteries.

Moreover, PVDF is not always sufficiently resistant to swelling by the liquid electrolyte (liquid that mediates lithium ion transfer between the positive and negative electrodes during charge/discharge) used in lithium batteries, and when as a consequence the PVDF in the composite layer is swollen by the liquid electrolyte, the composite layer/current collector interface is loosened up, as is contact by the active material with itself in the composite layer. This leads to a gradual disruption of the conductive network in the electrode and has been a factor in causing a timewise decline in capacity during the repetitive charge-discharge cycling of lithium batteries.

As a solution for these problems, Japanese Patent Application Laid-open No. 2003-132893 discloses a modified poly(meth)acrylonitrile-type binder resin obtained by copolymerization with a short-chain monomer such as $C_{2-4}$ 1-olefin and/or alkyl(meth)acrylate in which the alkyl group has no more than 3 carbons. Japanese Patent Application Laid-open No. 2003-132893 also discloses a binder resin obtained by blending this modified poly(meth)acrylonitrile-type binder resin with, for example, a rubbery component having a glass-transition temperature of –80° C. to 0° C. In addition, the use of a binary copolymer of acrylonitrile and short-chain methyl methacrylate as the binder resin is also disclosed in *Journal of Power Sources* 109 (2002) 422-426.

However, poly(meth)acrylonitrile is inherently a polymer with a rigid molecular structure, and the copolymers with short-chain monomer as described in the aforementioned documents create problems with regard to the softness and flexibility of the resulting electrode, even when a rubbery component is blended therein. This has created the risk of the generation of defects, for example, cracking in the composite layer, during the fabrication of lithium battery electrodes, for example, during roll press molding or during the step in which the positive electrode and negative electrode are wound with an interposed separator into a coil.

DISCLOSURE OF THE INVENTION

An object of the present invention is to provide a binder resin composition for nonaqueous electrolyte energy device electrodes (in some instances referred to below simply as the "binder resin composition") that exhibits excellent adhesion to electrode current collectors and particularly the current collector for the negative electrode, that exhibits an excellent resistance to swelling by liquid electrolyte, and that provides an electrode having excellent softness and flexibility.

Another object of the present invention is to provide, through the use of the aforementioned binder resin composition, a nonaqueous electrolyte energy device and particularly a lithium battery electrode and a lithium battery, that exhibit a high capacity and excellent charge-discharge characteristics wherein there is little decline in the capacity during charge-discharge cycling.

As a result of extensive and intensive research, the present inventors discovered that an excellent resistance to swelling by liquid electrolyte, an excellent adhesiveness to the electrode current collector, and an electrode with an excellent softness and flexibility are obtained by using, as the binder resin composition for a nonaqueous electrolyte energy device electrode, a copolymer of a nitrile group-containing monomer, a soft and flexible relatively long-chain monomer containing an oxyethylene skeleton and/or monomer containing a relatively long-chain alkyl group, and optionally a highly adhesive carboxyl group-containing monomer.

That is, 1. the present invention relates to a binder resin composition for a nonaqueous electrolyte energy device electrode, comprising a copolymer which contains a repeat unit derived from a nitrile group-containing monomer; a repeat unit derived from a monomer represented by Formula (I)

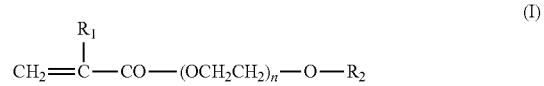

(wherein $R_1$ is H or $CH_3$; $R_2$ is H or monovalent hydrocarbonyl group; and n is an integer from 1 to 50) and/or a repeat unit derived from a monomer represented by Formula (II)

(wherein $R_3$ is H or $CH_3$ and $R_4$ is hydrogen or $C_{4-100}$ alkyl); and optionally a repeat unit derived from a carboxyl group-containing monomer.

2. The present invention also relates to the aforementioned binder resin composition for a nonaqueous electrolyte energy device electrode, wherein the repeat unit derived from monomer represented by the aforementioned Formula (I) and/or (II) is present at 0.001 to 0.2 mol per 1 mol repeat unit derived from the aforementioned nitrile group-containing monomer and the repeat unit derived from the aforementioned carboxyl group-containing monomer, when present, is present at 0.01 to 0.2 mol per 1 mol repeat unit derived from the aforementioned nitrile group-containing monomer.

3. The present invention relates to the aforementioned binder resin composition for a nonaqueous electrolyte energy device electrode, wherein the nitrile group-containing monomer is acrylonitrile.

4. The present invention relates to the aforementioned binder resin composition for a nonaqueous electrolyte energy device electrode, wherein the carboxyl group-containing monomer is acrylic acid.

5. The present invention relates to the aforementioned binder resin composition for a nonaqueous electrolyte energy device electrode, wherein $R_2$ is $C_{1-12}$ alkyl or phenyl.

6. The present invention relates to the aforementioned binder resin composition for a nonaqueous electrolyte energy device electrode, comprising monomer represented by Formula (I) that is methoxytriethylene glycol acrylate.

7. The present invention relates to a nonaqueous electrolyte energy device electrode that has a current collector and a composite layer disposed on at least one side of the current collector, wherein the composite layer comprises the aforementioned binder resin composition for a nonaqueous electrolyte energy device electrode, that contains an active material.

8. The present invention relates to a nonaqueous electrolyte energy device, preferably a lithium battery, that contains the aforementioned nonaqueous electrolyte energy device electrode.

The binder resin composition according to the present invention for a nonaqueous electrolyte energy device, because it has a copolymer structure from a nitrile group-containing monomer, a soft and flexible relatively long-chain monomer containing an oxyethylene skeleton and/or monomer containing a relatively long-chain alkyl group, and optionally a highly adhesive carboxyl group-containing monomer, exhibits an excellent adhesiveness for the negative electrode current collector and an excellent resistance to swelling by liquid electrolyte and provides a soft and flexible electrode. As a consequence, a lithium battery that is a nonaqueous electrolyte energy device that uses an electrode fabricated using the binder resin composition according to the present invention, will have a high capacity and will present little decline in capacity during charge-discharge cycling.

BEST MODE FOR CARRYING OUT THE INVENTION (1) The Binder Resin Composition for Nonaqueous Electrolyte Energy Devices The binder resin composition according to the present invention for nonaqueous electrolyte energy devices characteristically contains a copolymer comprising (1) a repeat unit that originates from a nitrile group-containing monomer, (2) a repeat unit that originates from monomer with Formula (I) and/or a repeat unit that originates from monomer with Formula (II), and (3) optionally a repeat unit that originates from a carboxyl group-containing monomer

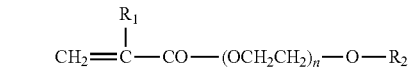

(wherein $R_1$ is H or $CH_3$; $R_2$ is H or monovalent hydrocarbonyl group; and n is an integer from 1 to 50)

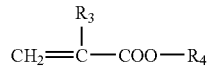

(wherein $R_3$ is H or $CH_3$ and $R_4$ is hydrogen or $C_{4-100}$ alkyl).

(1-1) The Nitrile Group-Containing Monomer

There are no particular limitations on the nitrile group-containing monomer used in the present invention, and this monomer can be exemplified by acrylic-type nitrile group-containing monomers such as acrylonitrile and methacrylonitrile, cyano-type nitrile-group containing monomers such as αcyanoacrylate and dicyanovinylidene, and fumaric-type nitrile group-containing monomers such as fumaronitrile. Acrylonitrile is preferred among these from the standpoints of ease of polymerization, cost performance, and electrode softness and flexibility. A single nitrile group-containing monomer may be used or two or more nitrile group-containing monomers may be used in combination. When acrylonitrile and methacrylonitrile are used as the nitrile group-containing monomer of the present invention, the acrylonitrile suitably comprises, for example, 5 to 95 mass % and preferably 50 to 95 mass % of the total quantity of the nitrile group-containing monomer.

(1-2) The Monomer with Formula (I)

There are no particular limitations in the present invention on the monomer with Formula (I).

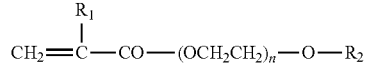

Here, $R_1$ is H or $CH_3$. n is an integer from 1 to 50, preferably 2 to 30, and more preferably 2 to 10. $R_2$ is monovalent hydrocarbonyl group, and, for example, is suitably monovalent hydrocarbonyl group having 1 to 50, preferably 1 to 25, and more preferably 1 to 12 carbons. A satisfactory resistance to liquid electrolyte-induced swelling can be obtained when the number of carbons is no greater than 50. This hydrocarbonyl group is suitably, for example, an alkyl group or the phenyl group. In particular, $R_2$ is suitably phenyl or $C_{1-12}$ alkyl. This alkyl may be straight chain or branched. The alkyl group and phenyl group under consideration may also be partially substituted by, for example, halogen such as fluorine, chlorine, bromine, and iodine; nitrogen; phosphorus; an aromatic ring; or a $C_{3-10}$ cycloalkane.

The following are specific, commercially available examples: ethoxydiethylene glycol acrylate (trade name: Light-Acrylate EC-A, product of Kyoeisha Chemical Co., Ltd.), methoxytriethylene glycol acrylate (trade name: Light-Acrylate MTG-A, product of Kyoeisha Chemical Co., Ltd.; trade name: NK Ester AM-30G, product of Shin-Nakamura Chemical Co., Ltd.), methoxypoly(n=9)ethylene glycol acrylate (trade name: Light-Acrylate 130-A, product of Kyoeisha Chemical Co., Ltd.; trade name: NK Ester AM-90G, product of Shin-Nakamura Chemical Co., Ltd.), methoxypoly(n=13) ethylene glycol acrylate (trade name: NK Ester AM-130G), methoxypoly(n=23)ethylene glycol acrylate (trade name: NK Ester AM-230G, product of Shin-Nakamura Chemical Co., Ltd.), octoxypoly(n=18)ethylene glycol acrylate (trade name: NK Ester A-OC-18E, product of Shin-Nakamura Chemical Co., Ltd.), phenoxydiethylene glycol acrylate (trade name: Light-Acrylate P-200A, product of Kyoeisha Chemical Co., Ltd.; trade name: NK Ester AMP-20GY, product of Shin-Nakamura Chemical Co., Ltd.), phenoxypoly (n=6)ethylene glycol acrylate (trade name: NK Ester AMP-60G, product of Shin-Nakamura Chemical Co., Ltd.), nonylphenol EO adduct (n=4) acrylate (trade name: Light-Acrylate NP-4EA, product of Kyoeisha Chemical Co., Ltd.), nonylphenol EO adduct (n=8) acrylate (trade name: Light-Acrylate NP-8EA, product of Kyoeisha Chemical Co., Ltd.), methoxydiethylene glycol methacrylate (trade name: Light-Ester MC, product of Kyoeisha Chemical Co., Ltd.; trade name: NK Ester M-20G, product of Shin-Nakamura Chemical Co., Ltd.), methoxytriethylene glycol methacrylate (trade name: Light-Ester MTG, product of Kyoeisha Chemical Co., Ltd.), methoxypoly(n=9)ethylene glycol methacrylate (trade name: Light-Ester 130MA, product of Kyoeisha Chemical Co., Ltd.; trade name: NK Ester M-90G, product of Shin-Nakamura Chemical Co., Ltd.), methoxypoly(n=23)ethylene glycol methacrylate (trade name: NK Ester M-230G, product of Shin-Nakamura Chemical Co., Ltd.), and methoxypoly (n=30)ethylene glycol methacrylate (trade name: Light-Ester 041MA, product of Kyoeisha Chemical Co., Ltd.). Methoxytriethylene glycol acrylate (in general Formula (I): $R_1$=H, $R_2$=$CH_3$, n=3) is particularly preferred among the preceding from the standpoint, inter alia, of the reactivity during copolymerization with acrylonitrile. A single one of these monomers with general Formula (I) can be used, or two or more can be used in combination.

(1-3) The Monomer with Formula (II)

There are no particular limitations in the present invention on the monomer with Formula (II).

(II)

Here, $R_3$ is H or $CH_3$. $R_4$ is hydrogen or $C_{4-100}$, preferably $C_{4-50}$, more preferably $C_{6-30}$, and particularly preferably $C_{8-15}$ alkyl. A satisfactory flexibility can be obtained when the number of carbons is at least four, while a satisfactory resistance to liquid electrolyte-induced swelling can be obtained as long as the number of carbons is no greater than 100. The alkyl group comprising this $R_4$ may be straight chain or branched. The alkyl group comprising this $R_4$ may also be partially substituted by, for example, halogen such as fluorine, chlorine, bromine, and iodine; nitrogen; phosphorus; an aromatic ring; or a $C_{3-10}$ cycloalkane. The alkyl group comprising this $R_4$ may be, for example, a straight-chain or branched saturated alkyl group or a halogenated alkyl group such as fluoroalkyl, chloroalkyl, bromoalkyl, or iodoalkyl.

Specific examples are long-chain (meth)acrylate esters such as n-butyl(meth)acrylate, isobutyl(meth)acrylate, t-butyl(meth)acrylate, amyl(meth)acrylate, isoamyl(meth)acrylate, hexyl(meth)acrylate, heptyl(meth)acrylate, octyl(meth) acrylate, 2-ethylhexyl(meth)acrylate, nonyl(meth)acrylate, decyl(meth)acrylate, isodecyl(meth)acrylate, lauryl(meth) acrylate, tridecyl(meth)acrylate, hexadecyl(meth)acrylate, stearyl(meth)acrylate, isostearyl(meth)acrylate, cyclohexyl (meth)acrylate, and isobornyl(meth)acrylate. Example for the case of $R_4$=fluoroalkyl are acrylate compounds such as 1,1-bis(trifluoromethyl)-2,2,2-trifluoroethyl acrylate, 2,2,3,3,4,4,4-heptafluorobutyl acrylate, 2,2,3,4,4,4-hexafluorobutyl acrylate, nonafluoroisobutyl acrylate, 2,2,3,3,4,4,5,5-octafluoropentyl acrylate, 2,2,3,3,4,4,5,5,5-nonafluoropentyl acrylate, 2,2,3,3,4,4,5,5,6,6,6-undecafluorohexyl acrylate, 2,2,3,3,4,4,5,5,6,6,7,7,8,8,8-pentadecafluorooctyl acrylate, 3,3,4,4,5,5,6,6,7,7,8,8,9,9,10,10,10-heptadecafluorodecyl acrylate, and 2,2,3,3,4,4,5,5,6,6,7,7,8,8,9,9,10,10-nonadecafluorodecyl acrylate, and methacrylate compounds such as nonafluoro-t-butyl methacrylate, 2,2,3,3,4,4,4-heptafluorobutyl methacrylate, 2,2,3,3,4,4,5,5-octafluoropentyl methacrylate, 2,2,3,3,4,4,5,5,6,6,7,7-dodecafluoroheptyl methacrylate, heptadecafluorooctyl methacrylate, 2,2,3,3,4,4,5,5,6,6,7,7,8,8,8-pentadecafluorooctyl methacrylate, and 2,2,3,3,4,4,5,5,6,6,7,7,8,8,9,9-hexadecafluorononyl methacrylate. A single one of these monomers with general Formula (II) may be used, or a combination of two or more may be used.

(1-4) The Carboxyl Group-Containing Monomer

There are no particular limitations in the present invention on the carboxyl group-containing monomer, and this monomer can be exemplified by acrylic-type carboxyl group-containing monomers such as acrylic acid and methacrylic acid, crotonic-type carboxyl group-containing monomers such as crotonic acid, maleic-type carboxyl group-containing monomers such as maleic acid and its anhydride, itaconic-type carboxyl group-containing monomers such as itaconic acid and its anhydride, and citraconic-type carboxyl group-containing monomers such as citraconic acid and its anhydride. Acrylic acid is preferred there among from the standpoints of, inter alia, ease of polymerization, cost performance, and electrode softness and flexibility. These carboxyl group-containing monomers may be used singly or in combinations of two or more. When acrylic acid and methacrylic acid are used as the carboxyl group-containing monomer of the present invention, the acrylic acid suitably comprises, for example, 5 to 95 mass % and preferably 50 to 95 mass % of the total amount of the carboxyl group-containing monomer.

(1-5) Additional Monomer

In addition to a repeat unit deriving from nitrile group-containing monomer, a repeat unit deriving from carboxyl group-containing monomer, and a repeat unit deriving from monomer with Formula (I) and/or (II), the binder resin composition of the present invention may also incorporate a suitable repeat unit from additional monomer that differs from the preceding monomers. This additional monomer is not particularly limited and can be exemplified by short-chain (meth)acrylate esters such as methyl(meth)acrylate, ethyl (meth)acrylate, and propyl(meth)acrylate; vinyl halides such as vinyl chloride, vinyl bromide, and vinylidene chloride; and also maleimide, phenylmaleimide, (meth)acrylamide, styrene, α-methylstyrene, vinyl acetate, sodium(meth)allylsulfonate, sodium(meth)allyloxybenzenesulfonate, sodium styrenesulfonate, and 2-acrylamido-2-methylpropanesulfonate and its salts. A single additional monomer can be used or two or more additional monomers can be used in combination.

(1-6) The Content of the Individual Monomer Repeat Units

The molar ratios for repeat unit derived from the nitrile group-containing monomer, repeat unit derived from the carboxyl group-containing monomer, and repeat unit derived from monomer with Formula (I) and/or Formula (II) are, for example, 0.01 to 0.2 mol, preferably 0.02 to 0.1 mol, and more preferably 0.03 to 0.06 mol repeat unit derived from carboxyl group-containing monomer, in each case per 1 mol repeat unit derived from the nitrile group-containing monomer, and 0.001 to 0.2 mol, preferably 0.003 to 0.05 mol, and more preferably 0.005 to 0.02 mol repeat unit derived from monomer with Formula (I) and/or Formula (II), in each case per 1 mol repeat unit derived from the nitrile group-containing monomer. The adhesion for the current collector and particularly a negative electrode current collector of copper foil, the resistance to liquid electrolyte-induced swelling, and the electrode softness and flexibility are all excellent when repeat unit derived from carboxyl group-containing monomer is present at 0.01 to 0.2 mol and repeat unit derived from monomer with Formula (I) and/or Formula (II) is present at 0.001 to 0.2 mol.

When an additional monomer is used, it is used in a proportion of 0.005 to 0.1 mol, preferably 0.01 to 0.06 mol, and more preferably 0.03 to 0.05 mol, in each case per 1 mol nitrile group-containing monomer.

(2) Production of the Binder Resin Composition for Nonaqueous Electrolyte Energy Devices The polymerization procedure used to synthesize the binder resin composition according to the present invention is not particularly limited and may be, for example, sedimentation polymerization, bulk polymerization, suspension polymerization, emulsion polymerization, or solution polymerization. However, sedimentation polymerization in water is preferred from the standpoints of ease of resin synthesis and the ease of carrying out post-treatments such as recovery and purification.

(2-1) The Polymerization Initiator

The polymerization initiator used to carry out sedimentation polymerization in water is preferably a water-soluble type based on a consideration of the efficiency of polymerization initiation. Water-soluble polymerization initiators can be exemplified by persulfates such as ammonium persulfate, potassium persulfate, and sodium persulfate; water-soluble peroxides such as hydrogen peroxide; water-soluble azo compounds such as 2,2'-azobis(2-methylpropionamidine hydrochloride); and redox types comprising the combination of an oxidizing agent, e.g., a persulfate salt, with a reducing agent, e.g., sodium bisulfite, ammonium bisulfite, sodium thiosulfate, or hydrosulfide, and a polymerization promoter such as sulfuric acid, iron sulfate, or copper sulfate. Preferred among the preceding are the persulfate salts and water-soluble azo compounds based on considerations such as the ease of resin synthesis. Ammonium persulfate is particularly preferred among the persulfate salts. When sedimentation polymerization in water is carried out with acrylonitrile selected for the nitrile group-containing monomer, acrylic acid selected for the carboxyl group-containing monomer, and methoxytriethylene glycol acrylate selected for the monomer with Formula (I), since all three of these are water soluble in monomer form, a water-soluble polymerization initiator will be able to act efficiently and polymerization will be started smoothly. Moreover, since the polymer precipitates as polymerization progresses, the reaction system converts to a suspension and a binder resin composition containing little unreacted material is ultimately obtained in high yields. The polymerization initiator, for example, is preferably used in the range of 0.001 to 5 mol % and more preferably in the range of 0.01 to 2 mol %, in each case with reference to the total amount of monomer used for the binder resin composition.

(2-2) The Chain-Transfer Agent

A chain-transfer agent can be used during sedimentation polymerization in water with the goal of controlling the molecular weight. The chain-transfer agent can be exemplified by mercaptan compounds, thioglycol, carbon tetrachloride, and α-methylstyrene dimer. α-methylstyrene dimer is preferred among the preceding based on a consideration, inter alia, of its low odor.

(2-3) The Solvent

As necessary, a solvent other than water can also be added to sedimentation polymerization in water, for example, to control the size of the precipitated particles. This solvent other than water can be exemplified by amides such as N-methyl-2-pyrrolidone, N,N-dimethylacetamide, and N,N-dimethylformamide; ureas such as N,N-dimethylethyleneurea, N,N-dimethylpropyleneurea, and tetramethylurea; lactones such as γ-butyrolactone and γ-caprolactone; carbonates such as propylene carbonate; ketones such as acetone, methyl ethyl ketone, methyl isobutyl ketone, and cyclohexanone; esters such as methyl acetate, ethyl acetate, n-butyl acetate, butylcellosolve acetate, butylcarbitol acetate, ethylcellosolve acetate, and ethylcarbitol acetate; glymes such as diglyme, triglyme, and tetraglyme; hydrocarbons such as toluene, xylene, and cyclohexane; sulfoxides such as dimethyl sulfoxide; sulfones such as sulfolane; and alcohols such as methanol, isopropanol, and n-butanol. A single one of these solvents may be used, or two or more may be used in combination.

(2-4) The Polymerization Method

Polymerization is carried out, for example, by introducing the nitrile group-containing monomer, carboxyl group-containing monomer, monomer with Formula (I) and/or Formula (II), and additional monomer into the solvent and maintaining a polymerization temperature of 0 to 100° C. and preferably 30 to 90° C. for 1 to 50 hours and preferably 2 to 12 hours. The polymerization proceeds as long as the polymerization temperature is at least 0° C., while even with the use of water as solvent, a polymerization temperature no greater than 100° C. avoids an inability to carry out polymerization due to the complete evaporation of the water.

The nitrile group-containing monomer and carboxyl group-containing monomer exhibit a particularly high heat of polymerization during the polymerization of the nitrile group-containing monomer, carboxyl group-containing monomer, monomer with Formula (I) and/or Formula (II), and additional monomer, and for this reason polymerization is preferably run while dripping these monomers into the solvent.

(2-5) Binder Resin Composition Formulation

The binder resin composition according to the present invention is produced by polymerization as described above and is generally used in the form of a varnish prepared by dissolving the binder resin composition in a solvent. The solvent used to prepare the binder resin composition varnish is not particularly limited and can be exemplified by water and the solvents that can be added when sedimentation polymerization in water as previously described is carried out. Among these, the amides, ureas, lactones, and mixed solvents containing the preceding are preferred from the standpoint of the ability to dissolve the binder resin composition according to the present invention, while N-methyl-2-pyrrolidone, γ-butyrolactone, and mixed solvents containing the preceding are even more preferred there among. A single one of these solvents may be used, or two or more may be used in combination.

This solvent is used in at least the minimum amount required to maintain the binder resin composition in a dissolved state at ambient temperature, but its amount of use is not otherwise particularly limited. However, since viscosity adjustment through the addition of solvent is typically carried out in the slurry production step during the ensuing fabrication of the nonaqueous electrolyte energy device electrode, the solvent is preferably used in any amount that does not result in excessive dilution beyond that which is necessary.

Here, for the case of an N-methyl-2-pyrrolidone (NMP) solution to which 10 mass % binder resin composition with reference to the total has been added, a suitable viscosity to which adjustment should be carried out in the slurry production step is preferably 500 mPa·s to 50000 mPa·s at 25° C., more preferably 1000 mPa·s to 20000 mPa·s at 25° C., and very preferably 2000 mPa·s to 10000 mPa·s at 25° C.

(2-6) Other Additives

As necessary, the binder resin composition of the present invention can also contain other substances, for example, a crosslinking component in order to supplement the ability to resist liquid electrolyte-induced swelling, a rubbery component in order to supplement electrode softness and flexibility, and various additives for improving the slurry coatability on the electrode, such as a precipitation inhibitor, defoamer, and leveling agent.

(3) Applications of the Binder Resin Composition of the Present Invention

The binder resin composition of the present invention is well-adapted for use in energy devices and particularly nonaqueous electrolyte energy devices. A nonaqueous electrolyte energy device is a storage device or power-generating device (apparatus) that uses a liquid electrolyte other than water. Lithium batteries, electric double-layer capacitors, and solar cells are examples of nonaqueous electrolyte energy devices. The binder resin composition of the present invention has a pronounced ability to resist swelling by nonaqueous electrolytes, such as nonaqueous organic solvents, and in particular is preferably used for lithium battery electrodes. Moreover, the binder resin composition of the present invention can be widely used not only in nonaqueous electrolyte energy devices, but also in various coating resins, molding materials, and fibers, e.g., paints, adhesives, hardening agents, printing inks, solder resists, polishes, sealants for electronic components, surface protection films and interlayer dielectric films for semiconductors, electrical-insulating varnishes, and biomaterials. Electrodes for nonaqueous electrolyte energy devices and lithium batteries that use such electrodes are described in the examples provided below.

(a) Electrodes for Nonaqueous Electrolyte Energy Devices

The electrode according to the present invention for a nonaqueous electrolyte energy device is an electrode that has a current collector and a composite layer disposed on at least one surface of the current collector. The binder resin composition of the present invention can be used as a material constituting this composite layer.

(a-1) The Current Collector

The current collector in the present invention may be an electroconductive material, for example, a metal can be used. In specific terms, metals such as aluminum, copper, nickel, and so forth can be used. There are no particular limitations on the shape of the current collector, but a thin film shape is preferred from the standpoint of achieving a higher energy density for a lithium battery that is a nonaqueous electrolyte energy device. The thickness of the current collector is, for example, 5 to 30 µm and preferably 8 to 25 µm.

(a-2) The Composite Layer

The composite layer in the present invention comprises the above-described binder resin composition containing active material and so forth. The composite layer is obtained, for example, by preparing, proceeding as described above, a slurry containing the binder resin composition of the present invention, solvent, active material, and so forth; coating this slurry on the aforementioned current collector; and drying off the solvent.

(a-2-1) The Active Material

The active material used by the present invention, for example, can be an active material that can reversibly incorporate and release lithium ions due to the charging and discharging of a lithium battery that is a nonaqueous electrolyte energy device, but is not otherwise particularly limited. However, the positive electrode functions to release lithium ions during charging and incorporate lithium ions during discharge, while the negative electrode functions in reverse to the positive electrode by incorporating lithium ions during charging and releasing lithium ions during discharge, and as a consequence different materials adapted to each of these functionalities are ordinarily used for the active material of the positive electrode and the active material of the negative electrode.

The negative electrode active material is, for example, preferably a carbon material such as graphite, amorphous carbon, carbon fiber, coke, or active carbon, but composites of these carbon materials with a metal, e.g., silicon, tin, silver, and so forth, or an oxide thereof can also be used.

On the other hand, the positive electrode active material is, for example, preferably a lithium-containing complex metal oxide containing at least lithium and at least one metal selected from iron, cobalt, nickel, and manganese. For example, a lithium-manganese complex oxide, a lithium-cobalt complex oxide, or a lithium-nickel complex oxide can be used. Also usable as this lithium-containing complex metal oxide are lithium-containing metal composites obtained by substituting at least one metal selected from Al, V, Cr, Fe, Co, Sr, Mo, W, Mn, B, and Mg at a lithium site or a manganese, cobalt, or nickel site. The positive active material is preferably a lithium-manganese complex oxide represented by the general formula $Li_xMn_yO_2$ (wherein x is in the range $0.2 \leq x \leq 2.5$ and y is in the range $0.8 \leq y \leq 1.25$). A single one of these active materials may be used, or two or more may be used in combination.

The positive electrode active material may also be used in combination with an electrically conductive auxiliary. This electrically conductive auxiliary can be exemplified by graphite, carbon black, and acetylene black. A single such electrically conductive auxiliary may be used, or two or more may be used in combination.

(a-2-2) The Solvent

There are no particular limitations on the solvent used to form the composite layer, and a solvent that can homogeneously dissolve or disperse the binder resin composition may be used. The solvent used to dissolve the binder resin composition during varnish production can be used as such as the solvent used to form the composite layer. For example, a variety of solvents, such as water and organic solvents, can be used. For example, N-methyl-2-pyrrolidone and γ-butyrolactone are preferred. A single such solvent may be used, or two or more may be used in combination.

(a-2-3) Other Additives

A thickener can be added to the aforementioned slurry used to produce the composite layer in the present invention; this thickener can be added in order to improve the slurry's dispersion stability and/or coatability. The thickener can be exemplified by celluloses such as carboxymethyl cellulose, methyl cellulose, ethyl cellulose, and hydroxypropyl cellulose, as well as by their ammonium salts and alkali-metal salts; by polyacrylic acid and its alkali-metal salts; by ethylene-methacrylic acid copolymers; and by polyvinyl alcohol-type copolymers such as polyvinyl alcohol and ethylene-vinyl alcohol copolymers.

(a-3) Electrode Production

The electrode of the present invention for nonaqueous electrolyte energy devices can be produced using well-known electrode production methods without any particular limitation. For example, production can be carried out by coating a slurry containing the above-described binder resin composition, solvent, active material, and so forth, on at least one surface of a current collector and then drying off the solvent and optionally rolling, in order to form a composite layer on the current collector surface.

This coating can be carried out using, for example, a comma coater. Coating is suitably carried out on the opposing electrodes in such a manner that the active material utilization ratio per unit area is negative electrode/positive electrode=at least one. The slurry is coated in an amount, for example, that provides a dry mass for the composite layer of, for example, 5 to 30 g/m$^2$ and preferably 10 to 15 g/m$^2$. Removal of the solvent can be carried out, for example, by drying for 1 to 20 minutes and preferably 3 to 10 minutes at 50 to 150° C. and preferably 80 to 120° C. Rolling can be carried out, for example, using a roll press, wherein pressing is carried out so as to give a bulk density for the composite layer of, for example, 1 to 2 g/cm$^3$ and preferably 1.2 to 1.8 g/cm$^3$ for the composite layer for the negative electrode and, for example, 2 to 5 g/cm$^3$ and preferably 3 to 4 g/cm$^3$ for the composite layer for the positive electrode. In order to remove residual solvent and adsorbed water within the electrode, for example, vacuum drying may be carried out for 1 to 20 hours at 100 to 150° C.

(b) The Lithium Battery

A lithium battery that is a nonaqueous electrolyte energy device can be produced by additionally combining a liquid electrolyte with the electrode of the present invention for nonaqueous electrolyte energy devices.

(b-1) The Liquid Electrolyte

The liquid electrolyte used by the present invention is, for example, a liquid electrolyte that results in the realization of functionality as a lithium battery comprising a nonaqueous electrolyte energy device, but is not otherwise particularly limited. The liquid electrolyte can be exemplified by nonaqueous liquid electrolytes, for example, solutions obtained by dissolving an electrolyte such as LiClO$_4$, LiBF$_4$, LiI, LiPF$_6$, LiCF$_3$SO$_3$, LiCF$_3$CO$_2$, LiAsF$_6$, LiSbF$_6$, LiAlCl$_4$, LiCl, LiBr, LiB (C$_2$H$_5$)$_4$, LiCH$_3$SO$_3$, LiC$_4$F$_9$SO$_3$, Li(CF$_3$SO$_2$)$_2$N, or Li[(CO$_2$)$_2$]$_2$B in an organic solvent, for example, a carbonate such as propylene carbonate, ethylene carbonate, butylene carbonate, dimethyl carbonate, diethyl carbonate, or methyl ethyl carbonate; a lactone such as γ-butyrolactone; an ether such as trimethoxymethane, 1,2-dimethoxyethane, diethyl ether, 2-ethoxyethane, tetrahydrofuran, or 2-methyltetrahydrofuran; a sulfoxide such as dimethyl sulfoxide; an oxolane such as 1,3-dioxolane or 4-methyl-1,3-dioxolane; a nitrogenous species such as acetonitrile, nitromethane, or N-methyl-2-pyrrolidone; an ester such as methyl formate, methyl acetate, butyl acetate, methyl propionate, ethyl propionate, or a phosphate triester; a glyme such as diglyme, triglyme, or tetraglyme; a ketone such as acetone, diethyl ketone, methyl ethyl ketone, or methyl isobutyl ketone; a sulfone such as sulfolane; an oxazolidinone such as 3-methyl-2-oxazolidinone; or a sultone such as 1,3-propanesultone, 4-butanesultone, or naphthasultone. Preferred among the preceding are solutions comprising LiPF$_6$ dissolved in a carbonate. The liquid electrolyte used, for example, can be prepared from a single organic solvent as described above and a single electrolyte as described above, or from a combination of two or more of the organic solvents and a single electrolyte, or from a single organic solvent and a combination of two or more electrolytes, or from a combination of two or more organic solvents and two or more electrolytes.

(b-2) Lithium Battery Production

There are no particular limitations on the method for producing a lithium battery that is a nonaqueous electrolyte energy device according to the present invention, and any known method can be employed. For example, the two electrodes, i.e., the positive electrode and the negative electrode, with a separator comprising a microporous polyethylene membrane disposed therebetween, may first be wound into a coil. The resulting spiral-wound assembly may then be inserted into a battery can, and a tab terminal welded in advance to the current collector of the negative electrode, may then be welded to the bottom of the battery can. The liquid electrolyte may then be injected into the resulting battery can; a tab terminal welded in advance to the current collector of the positive electrode, may then be welded to the lid of the battery; the lid may then be positioned on the top of the battery can with an insulating gasket disposed therebetween; and the battery may be obtained by sealing by crimping the region where the lid and battery can are in contact.

EXAMPLES

The present invention is described in additional detail by the examples provided below, but the present invention is not limited by these examples.

(A) Test 1. Examples of binder resin compositions that do not contain a repeat unit derived from a carboxyl group-containing monomer <Binder Resin Composition Production 1>

Example 1

A reaction solution was prepared by introducing, under a nitrogen blanket, 45.0 g acrylonitrile (nitrile group-containing monomer, from Wako Pure Chemical Industries, Ltd.), 5.0 g lauryl acrylate (Aldrich, monomer with Formula (II), 0.0232 mol per 1 mol acrylonitrile), 1.175 mg potassium persulfate (polymerization initiator, from Wako Pure Chemical Industries, Ltd.), 135 mg α-methylstyrene diner (chain-transfer agent, from Wako Pure Chemical Industries, Ltd.), and 450 mL purified water (Wako Pure Chemical Industries, Ltd.) into a 1.0-liter separable flask equipped with a stirrer, thermometer, and reflux condenser. The reaction solution was vigorously stirred for 3 hours at 60° C. and 3 hours at 80° C. After cooling to room temperature, the reaction solution was suction-filtered and the precipitated resin was filtered off. The filtered-off resin was washed in sequence with 300 mL purified water (Wako Pure Chemical Industries, Ltd.) and 300 mL acetone (Wako Pure Chemical Industries, Ltd.). The washed resin was dried for 24 hours in a vacuum dryer at 60° C./1 torr to give the binder resin composition.

Examples 2 to 7 and Comparative Example 1

Examples 2 to 7 and Comparative Example 1 were carried out entirely by the method described in Example 1, but using the values for the monomer, polymerization initiator, and chain-transfer agent composition shown in Table 1.

The compositions and yields are shown in Table 1 for Examples 1 to 7 and Comparative Example 1.

TABLE 1

| | monomer composition (amount used (g)/molar ratio relative to 1 mol acrylonitrile) | | | | polymerization initiator(g) | chain-transfer agent(g) | |
|---|---|---|---|---|---|---|---|
| | acrylo-nitrile | lauryl acrylate | perfluorooctyl-ethyl acrylate | ethyl acrylate | potassium persulfate | α-methylstyrene dimer | yield (%) |
| Example 1 | 45/1 | 5/0.0232 | — | — | 0.12 | 0.15 | 96.5 |
| Example 2 | 40/1 | 5/0.0261 | — | — | 0.11 | 0.14 | 94.3 |
| Example 3 | 35/1 | 10/0.0596 | — | — | 0.10 | 0.12 | 95.2 |
| Example 4 | 45/1 | — | 5/0.0114 | — | 0.12 | 0.15 | 89.7 |
| Example 5 | 40/1 | — | 10/0.0256 | — | 0.10 | 0.13 | 98.9 |
| Example 6 | 35/1 | — | 15/0.0439 | — | 0.09 | 0.12 | 93.4 |
| Example 7 | 30/1 | 20/0.1390 | — | — | 0.09 | 0.11 | 78.3 |
| Comparative Example 1 | 45/1 | — | — | 5/0.0590 | 0.13 | 0.16 | 98.1 |

<Binder Resin Composition Evaluation 1>
(1) Resistance to Liquid Electrolyte-Induced Swelling A varnish containing 10 mass % binder resin composition with reference to the whole was prepared by mixing N-methyl-2-pyrrolidone (NMP) with a binder resin composition prepared in Example 1 to 7 or Comparative Example 1. The varnish was coated on a glass substrate so as to give a post-drying film thickness of approximately 10 μm, and a resin film was produced by drying for 2 hours in a convection dryer at 120° C. followed by drying in a vacuum dryer for 10 hours (120° C./1 torr). Then, while operating in a glove box under an argon blanket, a 2-cm square of the resulting resin film was cut out and its mass was measured. This resin film section and liquid electrolyte (1 M LiPF$_6$ ethylene carbonate/diethyl carbonate/dimethyl carbonate=1/1/1 (volumetric ratio)) in sufficient quantity to immerse the resin film were then placed in a sealable container and the container was sealed. The sealed container holding the resin film and liquid electrolyte was placed in a thermostat at 25° C. or 50° C. and was held for 24 hours. The sealed container was then again placed in a glove box under an argon blanket; the resin film was removed; the liquid electrolyte clinging to the surface was wiped off with filter paper; and the post-immersion mass was measured. The degree of swelling was calculated using the formula given below, and the results are shown in Table 2. A lower degree of swelling is presumed to be indicative of a better resistance to swelling.

degree of swelling(%)=[(post-immersion mass(g)–pre-immersion mass(g))/(pre-immersion mass)]×100

(2) Adhesion to the Current Collector

Example 8

Composite slurries were prepared by mixing amorphous carbon with an average particle size of 20 μm and the binder resin composition-containing varnish prepared in Example 1 (containing 10 mass % binder resin composition) in the range from 99.0 mass %: 10.0 mass % (1.0 mass % as resin fraction) to 95.0 mass %: 50.0 mass % (5.0 mass % as resin fraction) and adding NMP for viscosity adjustment. These were uniformly coated on 10 μm-thick copper foil (current collector), and a sheet-shaped electrode was prepared by then drying for 1 hour in a convection dryer set at 80° C. Seven sheet-shaped electrodes having different resin fractions were prepared in this manner. Each sheet-shaped electrode was pressed with a roll press to prepare an electrode having a composite density of 1.5 g/cm$^3$. The presence/absence of laminate debonding was visually inspected at this point in order to investigate the relationship to the resin fraction (mass %). It is presumed that the absence of laminate debonding at a smaller resin fraction is indicative of a higher adhesive strength. The results are shown in Table 2.

Examples 9 to 14 and Comparative Example 2

Examples 9 to 14 and Comparative Example 2 were carried out entirely as in Example 8, but using the binder resin compositions prepared in Examples 2 to 7 and Comparative Example 1.

TABLE 2

| | binder resin composition | degree of swelling (%) | | presence/absence of debonding as a function of the resin fraction (mass %) | | | | | | |
|---|---|---|---|---|---|---|---|---|---|---|
| | | 25° C. | 50° C. | 1 | 1.5 | 2 | 2.5 | 3 | 4 | 5 |
| Example 8 | Example 1 | <1.0 | <1.0 | present | present | present | absent | absent | absent | absent |
| Example 9 | Example 2 | 1.6 | 2.4 | present | present | absent | absent | absent | absent | absent |
| Example 10 | Example 3 | 2.5 | 4.6 | present | present | absent | absent | absent | absent | absent |
| Example 11 | Example 4 | <1.0 | 1 | present | present | present | absent | absent | absent | absent |
| Example 12 | Example 5 | <1.0 | 1.1 | present | present | present | absent | absent | absent | absent |
| Example 13 | Example 6 | <1.0 | 1.7 | present | present | absent | absent | absent | absent | absent |
| Example 14 | Example 7 | 17.6 | 35.3 | present | absent | absent | absent | absent | absent | absent |
| Comparative Example 2 | Comparative Example 1 | <1.0 | <1.0 | present | present | present | present | present | present | absent |

As may be understood from Table 2, the degree of liquid electrolyte-induced swelling was low when the binder resin compositions of Examples 1 to 6 and Comparative Example 1 were used. It was also shown that a high degree of liquid electrolyte-induced swelling occurred with the use of a small amount of acrylonitrile and a large amount of monomer component with Formula (II) (Example 7). However, larger levels of the monomer component with Formula (II) resulted in a lower resin fraction at which debonding occurred and thus in a better adhesiveness. These results demonstrated that both resistance to liquid electrolyte and adhesiveness can be obtained by using the monomer component with Formula (II) in an amount in the preferred range of the present invention.

<Battery Property Evaluation 1>

(1) Positive Electrode Fabrication

Example 15

Lithium manganate with an average particle size of 10 μm, carbon powder with an average particle size of 3 μm, and the binder resin composition-containing varnish obtained in Example 1 (binder resin composition content=10 mass %) were mixed in proportions of 87.0 mass %: 8.7:43.0 mass % (4.3 mass % as the resin fraction), and a composite slurry was then prepared by the addition of NMP for viscosity adjustment. This slurry was coated and dried onto one side of 20 μm-thick aluminum foil. The composite is coated at the rate of 30 mg/cm$^2$. This was followed by rolling with a roll press to give a composite density of 2.6 g/cm$^3$; cutting into a circle with a diameter of 1.5 cm then gave a sheet-shaped positive electrode. The positive electrode was thereafter obtained by vacuum drying for 16 hours at 120° C. in order to remove residual solvent and adsorbed water in the electrode.

Examples 16 to 21 and Comparative Example 3

Positive electrodes were obtained proceeding exactly as in Example 15, but using the binder resin compositions from Examples 2 to 7 and Comparative Example 1.

(2) Negative Electrode Fabrication

Example 22

A composite slurry was prepared by mixing amorphous carbon with an average particle size of 20 μm and the binder resin composition-containing varnish prepared in Example 1 (binder resin composition content=10 mass %) in a proportion of 96 mass %: 40 mass % (4 mass % as the resin fraction) and adding NMP for viscosity adjustment. This slurry was coated and dried onto one side of 10 μm-thick copper foil. The composite is coated at the rate of 13 mg/cm$^2$. This was followed by rolling with a roll press to give a composite density of 1.5 g/cm$^3$; cutting into a circle with a diameter of 1.5 cm then gave a sheet-shaped negative electrode. The negative electrode was thereafter obtained by vacuum drying for 16 hours at 120° C. in order to remove residual solvent and adsorbed water in the electrode.

Examples 23 to 28 and Comparative Example 4

Negative electrodes were obtained proceeding exactly as in Example 22, but using the binder resin compositions from Examples 2 to 7 and Comparative Example 1.

<Fabrication of Coin Batteries for Positive Electrode Evaluation>

Example 29

The positive electrode fabricated in Example 15, a separator comprising a 25 μm-thick polyethylene microporous membrane cut into a circle with a diameter of 1.5 cm, lithium metal cut into a circle with a diameter of 1.5 cm, and 200 μm-thick copper foil cut into a circle with a diameter of 1.5 cm (spacer) were stacked in sequence in a stainless steel coin casing container with a diameter of 2.0 cm and several drops of liquid electrolyte (1 M LiPF$_6$ ethylene carbonate/diethyl carbonate/dimethyl carbonate=1/1/1 mixed solution (volumetric ratio)) were dripped in while avoiding overflow; a stainless steel cap was applied with an interposed polypropylene packing; and sealing was effected with a crimper for coin battery fabrication to give a battery for positive electrode evaluation.

Examples 30 to 35 and Comparative Example 5

Examples 30 to 35 and Comparative Example 5 were carried out entirely as in Example 29, but using the positive electrodes fabricated in Examples 16 to 21 and Comparative Example 3.

<Fabrication of Coin Batteries for Negative Electrode Evaluation>

Example 36

The negative electrode composite electrode fabricated in Example 22, a separator comprising a 25 μm-thick polyethylene microporous membrane cut into a circle with a diameter of 1.5 cm, lithium metal cut into a circle with a diameter of 1.5 cm, and 200 μm-thick copper foil cut into a circle with a diameter of 1.5 cm (spacer) were stacked in sequence in a stainless steel coin casing container with a diameter of 2.0 cm and several drops of liquid electrolyte (1 M LiPF$_6$ ethylene carbonate/diethyl carbonate/dimethyl carbonate=1/1/1 mixed solution (volumetric ratio)) were dripped in while avoiding overflow; a stainless steel cap was applied with an interposed polypropylene packing; and sealing was effected with a crimper for coin battery fabrication to give a battery for negative electrode evaluation.

Examples 37 to 42 and Comparative Example 6

Examples 37 to 42 and Comparative Example 6 were carried out entirely as in Example 36, but using the negative electrode composite electrodes fabricated in Examples 23 to 28 and Comparative Example 4.

<Measurement of the Capacity>

The capacity was measured using the batteries fabricated by the methods of Examples 29 to 42 and Comparative Examples 5 and 6. In the case of the coin batteries for positive electrode evaluation, charge-discharge was carried out at a constant current of 0.1 C from 3.0 V to 4.3 V at 50° C., and the discharge capacity in the fourth cycle was measured and designated as the battery capacity. In the case of the coin batteries for negative electrode evaluation, charge-discharge was carried out at constant current (0.1° C.)-constant voltage (switch to constant voltage from constant current at 0 V) from 0 V to 1.2 V at 50° C., and the discharge capacity in the fourth cycle was measured and designated as the battery capacity.

<Evaluation of the Cycling Characteristic>

The discharge capacity after 50 cycles was measured under the same conditions as for measurement of the capacity. The cycling characteristic was evaluated by reporting this value as a percentage with respect to the discharge capacity in the fourth cycle. A larger value is indicative of a better cycling characteristic.

<Evaluation of the Rate Characteristic>

The discharge capacity at 1 C was measured after 4 charge-discharge cycles under the same conditions as for measurement of the capacity. The rate characteristic was evaluated by reporting this value as a percentage with respect to the discharge capacity in the fourth cycle. A larger value is indicative of a better rate characteristic.

The composition of the monomer in the binder resin composition, the resistance to liquid electrolyte, and the results of the electrode and battery evaluations are shown in Table 3.

denser, and nitrogen inlet tube and, while passing nitrogen through at 200 mL/minute, the temperature was raised to 74° C. with stirring, after which nitrogen injection was halted. An aqueous solution containing 0.968 g ammonium persulfate (polymerization initiator) dissolved in 76 g purified water was then added, followed immediately by the dropwise addition over 2 hours of a mixed solution of 183.8 g acrylonitrile (nitrile group-containing monomer), 9.7 g acrylic acid (carboxyl group-containing monomer, 0.039 mol per 1 mol acrylonitrile), and 6.5 g methoxytriethylene glycol acrylate

TABLE 3

| cell | | electrode | monomer composition (molar ratio with respect to 1 mol acrylonitrile) | | | | resistance to swelling (degree of swelling: mass %) | adhesiveness | capacity (mAh) | CC, 50° C. (%) | RC, 50° C. (%) |
|---|---|---|---|---|---|---|---|---|---|---|---|
| | | | AN | LA | PFOEA | EA | | | | | |
| ecathode | Ex. 29 | Ex. 15 | 1 | 0.0232 | — | — | <1.0 | ND | 105 | 68.6 | 93 |
| | Ex. 30 | Ex. 16 | 1 | 0.0261 | — | — | 2.4 | ND | 105 | 67.2 | 93 |
| | Ex. 31 | Ex. 17 | 1 | 0.0596 | — | — | 4.6 | ND | 102 | 66.5 | 91 |
| | Ex. 32 | Ex. 18 | 1 | — | 0.0114 | — | 1 | ND | 105 | 66.5 | 93 |
| | Ex. 33 | Ex. 19 | 1 | — | 0.0256 | — | 1.1 | ND | 103 | 65.1 | 92 |
| | Ex. 34 | Ex. 20 | 1 | — | 0.0439 | — | 1.7 | ND | 102 | 64.4 | 90 |
| | Ex. 35 | Ex. 21 | 1 | 0.1390 | — | — | 35.3 | ND | 100 | 52.5 | 72 |
| | Comp. Ex. 5 | Comp. Ex. 3 | 1 | — | — | 0.0590 | <1.0 | PPD | MNP | MNP | MNP |
| anode | Ex. 36 | Ex. 22 | 1 | 0.0232 | — | — | <1.0 | ND | 325 | 67.2 | 90 |
| | Ex. 37 | Ex. 23 | 1 | 0.0261 | — | — | 2.4 | ND | 320 | 67.2 | 87 |
| | Ex. 38 | Ex. 24 | 1 | 0.0596 | — | — | 4.6 | ND | 317 | 66.5 | 80 |
| | Ex. 39 | Ex. 25 | 1 | — | 0.0114 | — | 1 | ND | 323 | 67.2 | 90 |
| | Ex. 40 | Ex. 26 | 1 | — | 0.0256 | — | 1.1 | ND | 312 | 65.1 | 86 |
| | Ex. 41 | Ex. 27 | 1 | — | 0.0439 | — | 1.7 | ND | 300 | 64.4 | 83 |
| | Ex. 42 | Ex. 28 | 1 | 0.1390 | — | — | 35.3 | ND | 275 | 53.9 | 69 |
| | Comp. Ex. 6 | Comp. Ex. 4 | 1 | — | — | 0.0590 | <1.0 | PPD | MNP | MNP | MNP |

AN = acrylonitrile
LA = lauryl acrylate
PFOEA = perfluorooctylethyl acrylate
EA = ethyl acrylate
CC = cycling characteristic
RC = rate characteristic
ND = no debonding
PPD = post-pressing debonding
MNP = measurement not possible
Comp. Ex. = Comparative Example
Ex. = Comparative Example
Ex. = Example As the table shows, batteries produced using a binder resin composition of the present invention (Examples 29 to 34 and 36 to 41) do not undergo laminate debonding due to an excellent adhesiveness and also exhibit an excellent capacity, an excellent cycling characteristic, and an excellent rate characteristic. In contrast, in the absence of a monomer component with general Formula (I) (Comparative Example 5), the adhesiveness was low due to a deficient flexibility and post-pressing debonding occurred.

Based on the preceding, it may be concluded that batteries producing using binder resin according to the present invention will exhibit excellent battery characteristics by virtue of their excellent adhesiveness and excellent resistance to liquid electrolyte.

(B) Test 2. Examples of binder resin compositions that contain a repeat unit originating from carboxyl group-containing monomer <Binder Resin Composition Production 2>

Example 43

1804 g purified water was introduced into a 3-liter separable flask equipped with a stirrer, thermometer, reflux con- (monomer with Formula (I), trade name: NK Ester AM-30G, product of Shin-Nakamura Chemical Co., Ltd., 0.0085 mol per 1 mol acrylonitrile) while holding the temperature of the system at 74±2° C. An aqueous solution containing an additional 0.25 g ammonium persulfate dissolved in 21.3 g purified water was then added to the reaction system suspension, after which the temperature was raised to 84° C. and the reaction was carried out for 2.5 hours while maintaining the temperature of the system at 84±2° C. After subsequently cooling to 40° C. over 1 hour, stirring was halted and spontaneous cooling was carried out at room temperature overnight to produce a reaction liquid in which a binder resin composition according to the present invention had precipitated. This reaction liquid was suction-filtered and the recovered damp precipitate was washed 3 times with 1800 g purified water and was thereafter subjected to vacuum drying for 10 hours at 80° C. and isolation purification to give the binder resin composition according to the present invention. The yield was 93%, and the acid value was 39 KOH mg/g (theoretical value: 38 KOH mg/g).

Example 44

243.0 g acrylonitrile (nitrile group-containing monomer), 40.5 g acrylic acid (carboxyl group-containing monomer, 0.122 mol per 1 mol acrylonitrile), 27.0 g lauryl acrylate (monomer with Formula (II), 0.024 mol per 1 mol acrylonitrile), 0.27 g α-methylstyrene dimer (chain-transfer agent), 3.55 g potassium persulfate (polymerization initiator), and 2915 g purified water were introduced into a 5-liter separable flask equipped with a stirrer, thermometer, and reflux condenser and the temperature was raised to 80° C. over 2 hours while stirring. An aqueous solution containing an additional 2.00 g potassium persulfate dissolved in 50 g purified water was then added and a reaction was carried out for 2.5 hours while holding the temperature of the system at 80±2° C. After subsequently cooling to 40° C. over 1 hour, stirring was halted and spontaneous cooling was carried out at room temperature overnight to produce a reaction liquid in which a binder resin composition according to the present invention had precipitated. This reaction liquid was suction-filtered and the recovered damp precipitate was washed 3 times with 1800 g acetone and was thereafter subjected to vacuum drying for 10 hours at 80° C. and isolation•purification to give the binder resin composition according to the present invention. The yield was 70%, and the acid value was 82 KOH mg/g (theoretical value: 102 KOH mg/g).

Example 45

A binder resin composition of the present invention was obtained proceeding as in Example 43, but in this case using 188.6 g acrylonitrile (nitrile group-containing monomer) and 4.8 g acrylic acid (carboxyl group-containing monomer, 0.019 mol per 1 mol acrylonitrile). The yield was 94% and the acid value was 19 KOH mg/g (theoretical value: 19 KOH mg/g).

Example 46

A binder resin composition of the present invention was obtained proceeding as in Example 43, but in this case using 182.3 g acrylonitrile (nitrile group-containing monomer), 4.7 g acrylic acid (carboxyl group-containing monomer, 0.019 mol per 1 mol acrylonitrile), and 12.9 g methoxytriethylene glycol acrylate (monomer with Formula (I), 0.0172 mol per 1 mol acrylonitrile). The yield was 92% and the acid value was 19 KOH mg/g (theoretical value: 18 KOH mg/g).

Example 47

A binder resin composition of the present invention was obtained proceeding as in Example 43, but in this case using 174.1 g acrylonitrile (nitrile group-containing monomer), 19.4 g acrylic acid (carboxyl group-containing monomer, 0.082 mol per 1 mol acrylonitrile), and 6.5 g methoxytriethylene glycol acrylate (monomer with Formula (I), 0.009 mol per 1 mol acrylonitrile). The yield was 92% and the acid value was 77 KOH mg/g (theoretical value: 75 KOH mg/g).

Comparative Example 7

A binder resin composition was obtained proceeding as in Example 43, but omitting both the carboxyl group-containing monomer and the monomer with Formula (I). The yield was 97% and the acid value was less than 1 KOH mg/g (theoretical value: 0 KOH mg/g). This comparative example is a comparative example relative to the examples of the present invention due to its lack of use of monomer with Formula (I) and/or Formula (II).

Comparative Example 8

A binder resin composition was obtained proceeding as in Example 43, but in this case omitting the use of the carboxyl group-containing monomer and using 16.1 g methyl acrylate (Wako Pure Chemical Industries, Ltd., reagent special grade, 0.054 mol per 1 mol acrylonitrile) in place of the monomer with Formula (I). The yield was 96% and the acid value was less than 1 KOH mg/g (theoretical value: 0 KOH mg/g) This comparative example is a comparative example relative to the examples of the present invention due to its lack of use of monomer with Formula (I) and/or Formula (II).

Comparative Example 9

PVDF (KF9130 from the Kureha Corporation) was used as the binder resin composition.

The monomer composition, yield, and acid value are shown in Table 4 for Examples 43 to 47 and Comparative Examples 7 to 9.

TABLE 4

| | monomer composition (molar ratio per 1 mol acrylonitrile) | | | | | yield | acid value (KOH mg/g) | |
| --- | --- | --- | --- | --- | --- | --- | --- | --- |
| | acrylo-nitrile | acrylic acid | methoxytriethylene glycol acrylate | lauryl acrylate | methyl acrylate | (mass %) | measured | theoretical |
| Example 43 | 1 | 0.039 | 0.0085 | — | — | 93 | 39 | 38 |
| Example 44 | 1 | 0.122 | — | 0.024 | — | 70 | 82 | 102 |
| Example 45 | 1 | 0.019 | 0.0085 | — | — | 94 | 19 | 19 |
| Example 46 | 1 | 0.019 | 0.017 | — | — | 92 | 19 | 18 |
| Example 47 | 1 | 0.082 | 0.009 | — | — | 92 | 77 | 75 |
| Comparative Example 7 | 1 | — | — | — | — | 97 | <1 | 0 |
| Comparative Example 8 | 1 | — | — | — | 0.054 | 96 | <1 | 0 |
| Comparative Example 9 | | PVDF | | | | — | — | — |

<Varnish Production>

For each of the binder resin compositions of Examples 43 to 47 and Comparative Examples 7 to 9, 150 g of the binder resin composition was introduced into a 3-liter separable flask equipped with a stirrer, thermometer, reflux condenser, and nitrogen inlet tube; 2350 g NMP was added; and the temperature was raised to 70° C. while stirring and injecting a very small amount of nitrogen (no more than 5 mL/minute). A varnish sample (6 mass % resin fraction) of the binder resin composition from each of the examples and comparative examples was obtained by dissolving the binder resin composition in the NMP by holding at the same temperature for 6 hours.

<Binder Resin Composition Evaluation 2>

Various properties (resistance to liquid electrolyte-induced swelling, adhesion to the negative electrode current collector, electrode softness and flexibility, and first charge-discharge characteristics) of each of the binder resin compositions from the examples and comparative examples were evaluated as described in the following.

(1) Resistance to Liquid Electrolyte-Induced Swelling

The varnish prepared as described above was cast onto a polyethylene terephthalate (PET) sheet followed by drying on a 100° C. hot plate for 3 hours. The dried residue was then peeled from the PET sheet and subjected to a vacuum heat-treatment for 5 hours in a vacuum dryer at 120° C. to give a film of the binder resin composition. Four 1.5 cm squares were cut from the resulting film and transferred into a glove box residing under an argon atmosphere and the dry mass was measured. This was followed by immersion for 24 hours at 23° C. in an electrolyte solution (from Kishida Chemical Co., Ltd., $LiPF_6$ dissolved in a 1 M concentration in an equivolume mixed solution of ethylene carbonate, dimethyl carbonate, and diethyl carbonate, this also applies below). The film was thereafter removed from the electrolyte solution; the electrolyte solution carried on the surface was wiped off with a dry paper towel; and the mass was then immediately measured. The resistance to liquid electrolyte-induced swelling was evaluated via the degree of swelling calculated with the following equation.

degree of swelling(mass %)=[(post-immersion mass−pre-immersion dry mass)/(pre-immersion dry mass)]×100

The liquid electrolyte-induced swelling is considered to be low when the degree of swelling is generally no more than 10, preferably no more than 5, and more preferably no more than 2.

(2) Adhesion to the Current Collector

The adhesion between the current collector and the binder resin composition of the present invention was evaluated as described in the following. Graphite (trade name MAG-C, from Hitachi Chemical Co., Ltd., massive artificial graphite, average particle size=35 μm, same below) was prepared as the active material used with a current collector for a negative electrode. For each varnish sample, seven blends with this graphite were prepared by varying the solid fraction (binder resin composition) from the varnish sample from 3.0 to 4.8 volume % as the internal ratio in steps of 0.3 volume %. Slurries for a negative electrode composite layer were prepared by mixing/kneading the blends, as necessary while adding NMP so as to bring the viscosity to 1 to 10 Pa·s at 25° C. and a shear rate of 50 $sec^{-1}$. The resulting slurries were uniformly coated using a microapplicator on one surface of a negative electrode current collector (rolled copper foil, thickness=14 μm, 200×100 mm, from Hitachi Cable, Ltd.) so as to provide a dried composite layer mass of 12.5 mg/$cm^2$.

The composite layer was then formed by drying the coated assembly for 1 hour in a convection dryer at 80° C., and compression molding was subsequently carried out with a roll press so as to give a bulk density for the composite layer of 1.5 g/$cm^3$, thus yielding a negative electrode whose surface carried a composite layer that contained the binder resin composition of the present invention.

The adhesion to the negative current collector was evaluated based on the minimum volume % of the binder resin composition at which separation at the composite layer/current collector interface was not observed. This minimum volume % was calculated with the following formula.

minimum volume(%)=(volume of the binder resin composition in the composite)/(volume of the composite)×100

The adhesion to the current collector was considered to be good when the minimum volume % was generally no more than 4.5, preferably no more than 4.2, and more preferably no more than 3.9.

(3) Evaluation of the Softness•Flexibility

Each of the minimum volume % samples used in the adhesion testing in (2) above under <Binder resin composition evaluation 2> was used to evaluate the softness and flexibility of the binder resin composition of the present invention. Each sample was wrapped, with the surface carrying the composite layer on the outside, over stainless steel bars having different diameters ranging from 2 to 20 mmØ in 1 mm steps.

The softness and flexibility was evaluated based on the smallest stainless steel bar diameter at which the generation of defects in appearance, such as cracking, could not be detected in the surface of the composite layer by visual observation upon wrapping. The softness and flexibility of a binder resin composition were regarded as good when this smallest diameter generally was no greater than 9 mmØ, preferably no greater than 6 mmØ, and more preferably no greater than 3 mmØ.

(4) First Charge-Discharge Characteristics

The first charge-discharge characteristics, which are evaluated on the basis of the discharge capacity during the first charge-discharge, the irreversible capacity, and the charge-discharge efficiency, are an indicator of the charge-discharge characteristics of a secondary battery. The discharge capacity during the first charge-discharge is an indicator of the capacity of the fabricated battery, and a larger discharge capacity during the first charge-discharge is presumed to indicate a battery with a larger capacity.

The irreversible capacity during the first charge-discharge is calculated from first charging capacity first discharging capacity, and a smaller irreversible capacity during the first charge-discharge is generally taken as indicative of an excellent battery that will resist a reduction in capacity even during repetition of the charge-discharge cycle.

The charge-discharge efficiency (%) during the first charge-discharge is calculated from [first discharge capacity/first charge capacity×100], and a larger charge-discharge efficiency during the first charge-discharge is taken as indicative of an excellent battery that will resist a reduction in capacity even during repetition of the charge-discharge cycle.

To evaluate the first charge-discharge characteristics of the binder resin composition of the present invention, a single-electrode cell was used that employed the individual minimum volume % samples used in the adhesion testing in (2) above under <Binder resin composition evaluation 2>. The working electrode was prepared by subjecting the particular sample to a vacuum heat treatment for 5 hours in a vacuum dryer at 120° C. Lithium metal (thickness=1 mm, from Mitsui Kinzoku) with a lightly polished surface was separately prepared as the counter electrode. A separator (microporous polyolefin, thickness=25 μm, from Tonen Tapyrus Co., Ltd., same below) wetted with liquid electrolyte was prepared as the insulator for separating the working electrode from the counter electrode. While working in a glove box under an argon blanket, a laminate was fabricated by stacking the working electrode and counter electrode in the sequence separator-counter electrode-separator-working electrode-separator. Stainless steel jigs were attached to the upper and lower surfaces of the resulting laminate and the laminate was immobilized in such a manner that there was no separation, after which it was introduced into a glass container to give a sealed single-electrode cell.

While operating in a glove box under an argon blanket, this single-electrode cell was subjected to constant-current charging at 23° C. to 0 V at a charging current of 0.5 mA (0.28 mA/cm$^2$) using a charge-discharge instrument (TOSCAT3100 from Toyo System Co., Ltd). Since the counter electrode is lithium metal, the working electrode becomes a positive electrode in relation to the potential, and this constant-current charging is thus a discharge in precise terms. In the present case, however, "charging" is defined as the insertion reaction of lithium ions into the graphite of the working electrode. The process was switched to constant-voltage charging at the point at which the voltage reached 0 V and charging was continued until the current value declined to 0.02 mA, after which constant-current discharge was carried out at a discharge current of 0.5 mA to a discharge end voltage of 1.5 V. The first charge-discharge characteristics of the single-electrode cell were evaluated by measuring the charging capacity per 1 g graphite and the discharging capacity per 1 g graphite during this process and calculating the irreversible capacity and the charge-discharge efficiency.

The first charge-discharge characteristics of the single-electrode cell were judged to be excellent when the discharge capacity was at least 330 mAh/g and preferably at least 335 mAh/g, the irreversible capacity was no more than 40 mAh/g and preferably no more than 30 mAh/g, and the charge-discharge efficiency was at least 90% and preferably at least 92%.

The results of the evaluation of the various properties of the aforementioned binder resin compositions are shown in Table 5.

and flexibility than Comparative Examples 7 and 8. Moreover, the binder resin composition of the present invention (Examples 43 to 47) exhibits a better resistance to liquid electrolyte-induced swelling than does Comparative Example 9, which results in the conductive network of the electrode being more resistant to collapse during charge-discharge.

<Battery Property Evaluation 2>

Fabrication Example 1

(1) Fabrication of the Negative Electrode

The binder resin composition varnish coated on the negative electrode current collector was the varnish corresponding to the minimum volume % in Example 43 and used in the adhesion testing in (2) above under <Binder resin composition evaluation 2>. This varnish was first uniformly coated using a transfer roll on both sides of a negative electrode current collector (rolled copper foil, thickness=10 μm, 200× 100 mm, from Hitachi Cable, Ltd.) so as to provide a dry composite layer mass of 29 mg/cm$^2$. A composite layer was then formed by drying the coated material for 5 minutes in a conveyor oven at 120° C., followed by compression molding with a roll press so as to give a bulk density for the composite layer of 1.5 g/cm$^3$. This was cut into a 56 mm square to give a strip-shaped sheet, and the negative electrode was then obtained by a vacuum heat treatment for 5 hours in a vacuum dryer at 120° C.

(2) Fabrication of the Positive Electrode

The binder resin composition varnish coated on the positive electrode current collector was the varnish corresponding to the minimum volume % in Comparative Example 9 and used in the adhesion testing in (2) above under <Binder resin composition evaluation 2>. A blend was first prepared by blending lithium cobaltate (positive electrode active material, average particle size=10 μm), the aforementioned varnish, a

TABLE 5

| | resistance to swelling (degree of swelling: mass %) | adhesion (minimum volume %) | softness flexibility (smallest diameter mmØ) | first charge-discharge characteristics | | |
|---|---|---|---|---|---|---|
| | | | | discharge capacity (mAh/g) | irreversible capacity (mAh/g) | charge-discharge efficiency (%) |
| Example 43 | 2 | 3.6 | 2 | 339 | 27 | 93 |
| Example 44 | 2 | 3.6 | 6 | 340 | 25 | 93 |
| Example 45 | 4 | 3.6 | 2 | 340 | 25 | 93 |
| Example 46 | 3 | 3.6 | 2 | 338 | 27 | 93 |
| Example 47 | 2 | 3.6 | 3 | 339 | 26 | 93 |
| Comparative Example 7 | 3 | 4.2 | 18 | 334 | 36 | 90 |
| Comparative Example 8 | 6 | 3.9 | 10 | 336 | 30 | 92 |
| Comparative Example 9 | 23 | 4.8 | 2 | 332 | 41 | 89 |

As shown in Table 5, the binder resin composition of the present invention (Examples 43 to 47) enables the fabrication of a negative electrode that, relative to Comparative Examples 7 to 9, provides a better adhesion to the negative electrode current collector at a smaller volumetric content. This results in excellent first charge-discharge characteristics (larger discharge capacity, larger charge-discharge efficiency, smaller irreversible capacity) for the single-electrode cell. In addition, the binder resin composition of the present invention (Examples 43 to 47) exhibits a better electrode softness synthetic graphite-type conductive auxiliary (JSP, average particle size=3 μm, from Nippon Graphite Industries, Ltd.), and a carbon black-type conductive auxiliary (Denka Black HS-100, average particle size=48 nm, from Denki Kagaku Kogyo Kabushiki Kaisha) so as to provide a 72.3:7.4:16.9:3.4 solid fraction volumetric ratio. A slurry for the positive electrode composite layer was prepared by mixing/kneading this blend, as necessary with the addition of NMP so as to give a viscosity of 1 to 10 Pa·s at 25° C. and a shear rate of 50 sec$^{-1}$. The resulting slurry was then uniformly coated using a transfer roll on both surfaces of a positive current collector (aluminum foil, thickness=10 μm) so as to give a dry composite layer mass of 65 mg/cm². A composite layer was then formed by drying the coated material for 5 minutes in a conveyor oven at 120° C., followed by compression molding with a roll press so as to give a bulk density for the composite layer of 3.2 g/cm³. This was cut to 54 mm wide to give a strip-shaped sheet, and the positive electrode was then obtained by a vacuum heat treatment for 5 hours in a vacuum dryer at 120° C.

Fabrication Example 2

The negative electrode and positive electrode were obtained as in Fabrication Example 1, but in this case using the varnish corresponding to the minimum volume % in Example 44 as the binder resin composition varnish coated on the negative electrode current collector.

Fabrication Example 3

The negative electrode and positive electrode were obtained as in Fabrication Example 1, but in this case using the varnish corresponding to the minimum volume % in Example 45 as the binder resin composition varnish coated on the negative electrode current collector.

Fabrication Example 4

The negative electrode and positive electrode were obtained as in Fabrication Example 1, but in this case using the varnish corresponding to the minimum volume % in Example 46 as the binder resin composition varnish coated on the negative electrode current collector.

Fabrication Example 5

The negative electrode and positive electrode were obtained as in Fabrication Example 1, but in this case using the varnish corresponding to the minimum volume % in Example 47 as the binder resin composition varnish coated on the negative electrode current collector.

Fabrication Example 6

The negative electrode and positive electrode were obtained as in Fabrication Example 1, but in this case using the varnish corresponding to the minimum volume % in Example 43 as the binder resin composition varnish coated on the current collectors of the negative and positive electrodes.

Comparative Fabrication Example 1

The negative electrode and positive electrode were obtained as in Fabrication Example 1, but in this case using the varnish corresponding to the minimum volume % in Comparative Example 9 as the binder resin composition varnish coated on the positive electrode current collector. This example constitutes a comparative fabrication example relative to the fabrication examples of the present invention because it uses the binder resin composition of Comparative Example 9 for both the positive electrode and the negative electrode.

(3) Lithium Battery Fabrication

A nickel current collecting tab was ultrasonically welded to the exposed region of the current collector of the negative electrode and positive electrode obtained in each of the aforementioned Fabrication Examples 1 to 6 and Comparative Fabrication Example 1, and these were then wound up, with a separator disposed therebetween, by an automatic winder to fabricate a spiral-wound assembly. This wound assembly was inserted in a battery can and the current collecting tab terminal of the negative electrode was welded to the bottom of the battery can, after which the current collecting tab terminal of the positive electrode was welded to the lid. This was subsequently dried at reduced pressure for 12 hours at 60° C. with the lid open. Then, while operating in a glove box under an argon blanket, approximately 5 mL electrolyte solution ($LiPF_6$ dissolved at a concentration of 1 mol/L in a mixed solution of ethylene carbonate/dimethyl carbonate/diethyl carbonate=1/1/1 (volumetric ratio)) was injected into the battery can. Sealing was carried out by crimping between the battery can and lid, resulting in the fabrication of an 18650-type lithium battery (cylindrical, diameter=18 mm, height=65 mm). Using a charge-discharge instrument (TOSCAT3000 from Toyo System Co., Ltd.), the resulting 18650-type lithium battery was subjected to constant-current charging at 23° C. and a charging current of 800 mA to 4.2 V; the process was switched to constant-voltage charging when the voltage reached 4.2 V; and charging was continued until the current value declined to 20 mA. The first discharge capacity was then measured by carrying out constant-current discharge at a discharge current of 800 mA to a discharge end voltage of 3.0 V. 200 charge-discharge cycles were then repeated with charging and discharging under these same conditions constituting 1 cycle. The charge-discharge cycle performance of the 18650-type lithium battery was evaluated based on the discharge capacity retention rate after the 200 cycles using the first discharge capacity as the 100% retention rate. The discharge capacity retention rate was calculated using the following formula.

discharge capacity retention rate(%)=discharge capacity after 200 cycles/first time discharge capacity×100

When the discharge capacity retention rate is at least 85% and preferably at least 90%, the charge-discharge cycle performance can be judged to be excellent since the battery resists the occurrence of capacity fading even during repetitive charge-discharge cycling. The results are shown in Table 6.

TABLE 6

|  | negative electrode | positive electrode | discharge capacity retention rate (%) |
| --- | --- | --- | --- |
| Fabrication Example 1 | Example 43 | Comparative Example 9 | 90 |
| Fabrication Example 2 | Example 44 | Comparative Example 9 | 91 |
| Fabrication Example 3 | Example 45 | Comparative Example 9 | 91 |
| Fabrication Example 4 | Example 46 | Comparative Example 9 | 88 |
| Fabrication Example 5 | Example 47 | Comparative Example 9 | 89 |
| Fabrication Example 6 | Example 43 | Example 43 | 93 |
| Comparative Fabrication Example 1 | Comparative Example 9 | Comparative Example 9 | 83 |

As may be understood from Table 6, the lithium batteries of Fabrication Examples 1 to 6, which employed an electrode fabricated using a binder resin composition according to the present invention, exhibited a charge-discharge cycle performance superior to that obtained in Comparative Fabrication Example 1.

The invention claimed is:

1. A binder resin composition for a nonaqueous electrolyte energy device electrode, comprising a copolymer which contains a repeat unit derived from acrylonitrile and a repeat unit derived from methoxytriethylene glycol acrylate; wherein the copolymer further comprises a repeat unit derived from acrylic acid; and wherein the repeat unit derived from methoxytriethylene glycol acrylate is present at 0.005 to 0.02 mol per 1 mol repeat unit derived from the acrylonitrile, and the repeat unit derived from acrylic acid is present at 0.019 to 0.082 mol per 1 mol repeat unit derived from the acrylonitrile.

2. The binder resin composition for a nonaqueous electrolyte energy device electrode according to claim 1, wherein the repeat unit derived from the methoxytriethylene glycol acrylate is 0.0085 to 0.017 mol per 1 mol repeat unit derived from the acrylonitrile.

3. A nonaqueous electrolyte energy device electrode, comprising: a current collector; and a composite layer disposed on at least one side of the current collector, wherein the composite layer comprises the binder resin composition for a nonaqueous electrolyte energy device electrode according to claim 1, which contains an active material.

4. A nonaqueous electrolyte energy device, which contains the nonaqueous electrolyte energy device electrode according to claim 3.

5. The nonaqueous electrolyte energy device according to claim 4, wherein the nonaqueous electrolyte energy device is a lithium battery.

* * * * *